US007783088B2

(12) United States Patent
Shinzaki et al.

(10) Patent No.: US 7,783,088 B2
(45) Date of Patent: Aug. 24, 2010

(54) FINGERPRINT AUTHENTICATING APPARATUS, LIVE-FINGER DETERMINING APPARATUS, AND LIVE-FINGER DETERMINING METHOD

(75) Inventors: Takashi Shinzaki, Kawasaki (JP); Koichiro Niinuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 945 days.

(21) Appl. No.: 11/534,851

(22) Filed: Sep. 25, 2006

(65) Prior Publication Data

US 2007/0211926 A1  Sep. 13, 2007

(30) Foreign Application Priority Data

Mar. 13, 2006 (JP) .............................. 2006-068230

(51) Int. Cl.
*G06K 9/00* (2006.01)
*G06T 7/00* (2006.01)
(52) U.S. Cl. ...................... 382/124; 382/115; 340/5.8; 340/5.83
(58) Field of Classification Search ................ 382/124, 382/127, 126, 125, 115, 116, 299, 100; 356/71; 340/5.83, 5.53, 825, 5.1, 5.8, 5.81, 5.82; 250/227.11; 427/1
See application file for complete search history.

(56) References Cited

U.S. PATENT DOCUMENTS

| 4,827,527 | A | 5/1989 | Morita et al. |
| 5,077,803 | A | 12/1991 | Kato et al. |
| 5,088,817 | A | 2/1992 | Igaki et al. |
| 5,177,802 | A | * | 1/1993 | Fujimoto et al. ............ 382/124 |
| 6,240,200 | B1 | * | 5/2001 | Wendt et al. ................. 382/127 |
| 6,292,576 | B1 | | 9/2001 | Brownlee |
| 6,888,956 | B2 | * | 5/2005 | Muramatsu et al. .......... 382/124 |
| 6,927,844 | B2 | * | 8/2005 | Higuchi et al. ................. 356/71 |
| 7,327,858 | B2 | * | 2/2008 | Weiss .......................... 382/115 |
| 7,349,562 | B2 | * | 3/2008 | Ogura ......................... 382/124 |
| 2002/0076089 | A1 | | 6/2002 | Muramatsu et al. |

FOREIGN PATENT DOCUMENTS

| DE | 103 21 543 A1 | 12/2004 |
| JP | 61-151788 A | 7/1986 |
| JP | 61-255481 A | 11/1986 |
| JP | 1-281583 A | 11/1989 |
| JP | 02-079181 A | 3/1990 |
| JP | 03087981 A | 4/1991 |
| JP | 2000/020684 A | 1/2000 |
| JP | 2003-331268 A | 11/2003 |
| JP | 2004234040 A | 8/2004 |

(Continued)

OTHER PUBLICATIONS

European Office Action dated May 4, 2009, issued in corresponding European Patent Application No. 06 254 958.2.

(Continued)

*Primary Examiner*—Sheela C Chawan
(74) *Attorney, Agent, or Firm*—Westerman, Hattori, Daniels & Adrian, LLP

(57) ABSTRACT

A fingerprint sensor acquires fingerprint information of an object being in contact. A light source irradiates a light to the object from a lateral side of the fingerprint sensor. A measuring unit measures a diffusion pattern of the light passing through the object. A determining unit determines whether the object is a live finger or an artificial finger based on the diffusion pattern measured by the measuring unit.

5 Claims, 11 Drawing Sheets

FOREIGN PATENT DOCUMENTS

| | | |
|---|---|---|
| JP | 2004-313459 A | 11/2004 |
| JP | 2005-253989 A | 9/2005 |
| JP | 4-277874 A | 9/2006 |
| WO | WO 03/056502 A1 * | 10/2003 |

OTHER PUBLICATIONS

Stetter, Dr. Ulrich et al.; "Access Control in biometric access systems"; Siemens Technik Report, Apr. 1999, D2.

European Search Report for Application No. 06 25 4985, mailed Jul. 9, 2007.

Japanese Office Action dated Dec. 22, 2009 (mailing date), issued in corresponding Japanese Patent Application No. 2006-068230.

Japanese Office Action dated Jun. 1, 2010, issued in corresponding Japanese patent application No. 2006-068230.

* cited by examiner

FINGERPRINT AUTHENTICATING APPARATUS, LIVE-FINGER DETERMINING APPARATUS, AND LIVE-FINGER DETERMINING METHOD

BACKGROUND OF THE INVENTION

1. Field of the Invention

The present invention generally relates to a technology for distinguishing a live finger from an artificial finger in a fingerprint authenticating system, even when the artificial finger is made of gummy material.

2. Description of the Related Art

Use of biometric information, such as fingerprints, for performing user authentication is becoming popular. It is said that the user authentication based on the biometric information is more reliable than the conventional method of using passwords or identification (ID) cards; because, while the passwords or the ID cards can be stolen or lost, the biometric information can not be stolen or lost. Even with the biometric information, however, there still is a possibility that a third person can maliciously pass as an authentic person.

In the case of a fingerprint for example, it is not very difficult to prepare an artificial finger that has the same fingerprint as that on a finger of an authentic user, and be successful in the user authentication by using the artificial finger. One approach to prevent that is to differentiate real fingers and artificial fingers, and not allow the use of the artificial fingers in the user authentication.

Artificial fingers can be made of silicon, rubber, gummy material (gelled gelatin solution) and the like. Silicon and rubber do not conduct electricity, so that artificial fingers made of silicon or rubber can be comparatively easily detected with capacitance fingerprint sensors or weak-electric-field fingerprint sensors. The gummy material, however, is very similar to the composition of human epidermis. Furthermore, it conducts electricity, which makes detection of the artificial fingers made of gummy material very difficult.

Japanese Patent Laid-Open Publication No. H2-79181 discloses a technology for differentiating an artificial finger from a real finger for preventing a fraud using an artificial finger made of such as gummy material by applying light in almost normal direction to a surface of an object and referring condition how the light diffuses.

However, even with the above disclosed technology, there still is a problem that detection of counterfeit is difficult when thin artificial fingerprint made of for example, gummy material, is attached to a surface of a real finger. The thin artificial fingerprint is transmissive, so that light can be applied to the surface of the finger through the gummy material and the light is diffused with the same diffusion-pattern as generated from a real finger.

SUMMARY OF THE INVENTION

It is an object of the present invention to at least partially solve the problems in the conventional technology.

A fingerprint authenticating apparatus according to one aspect of the present invention authenticates a user by comparing fingerprint information acquired from the user with pre-registered fingerprint information. The fingerprint authenticating apparatus includes a fingerprint sensor that acquires fingerprint information of an object being in contact; a light source that irradiates a light to the object from a lateral side of the fingerprint sensor; a measuring unit that measures a diffusion pattern of the light passing through the object; and a determining unit that determines whether the object is a live finger or an artificial finger based on the diffusion pattern measured by the measuring unit.

A live-finger determining apparatus according to another aspect of the present invention includes an input panel on which an object is to contact; a light source that irradiates a light to the object being in contact with the input panel from a lateral side of the input panel; a measuring unit that measures a diffusion pattern of the light passing through the object; and a determining unit that determines whether the object is a live finger or an artificial finger based on the diffusion pattern measured by the measuring unit.

A live-finger determining method according to still another aspect of the present invention includes irradiating a light to an object from a lateral side of the object; a diffusion pattern of the light passing through the object; and determining whether the object is a live finger or an artificial finger based on the diffusion pattern measured at the measuring.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below in detail with reference to the accompanying drawings. The present invention is not limited to the embodiments explained below. In this document, it is assumed that an artificial finger includes a live-finger that is attached with an artificial fingerprint as well as an artificial finger that is artificially made.

A principle of a live-finger determining method according to an embodiment of the present invention is explained below with reference to FIGS. 1A to 1G. In the live-finger determining method, light is applied from a lateral side of an object (a live-finger or an artificial finger). Then, the object is determined whether it is a live-finger or an artificial finger by measuring a size of a light-diffusion pattern area generated from the applied light.

Figure 1A:
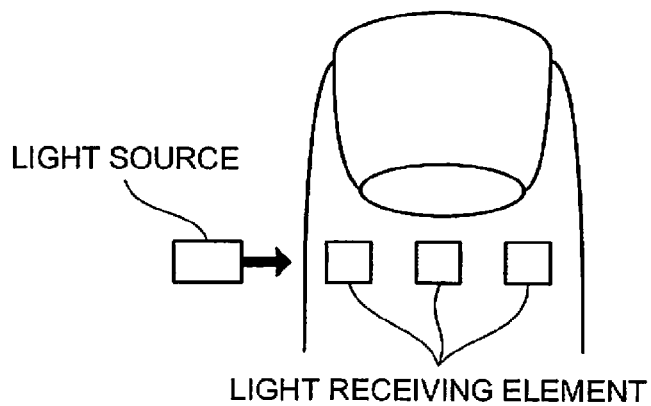
FIG. 1A is a schematic for illustrating an example of an arrangement of a light source and light receiving elements.

As shown in FIG. 1A, it is assumed here that light source is arranged so that light is applied from a lateral side of an object that is placed on an input panel for a fingerprint authentication and three light receiving elements are arranged so that a distance from the light source varies with respect to each light receiving element for detecting a diffusion pattern of light that penetrates the object.

Figure 1B:
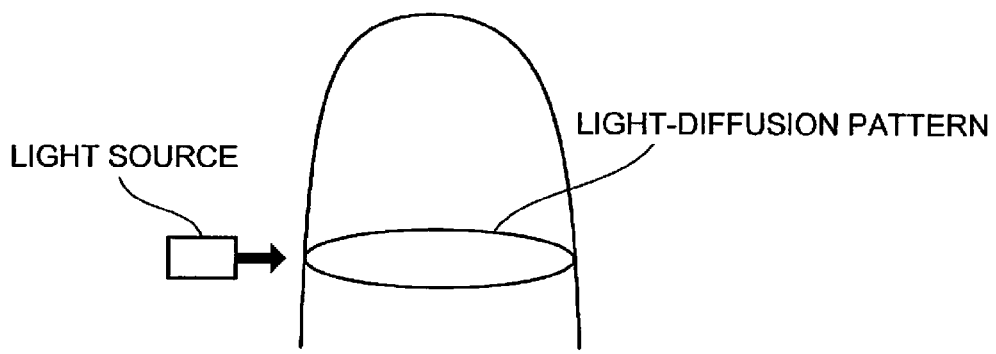
FIG. 1B is an example of a diffusion pattern of a light from the light source in a case of a gummy fingerprint.
Figure 1C:
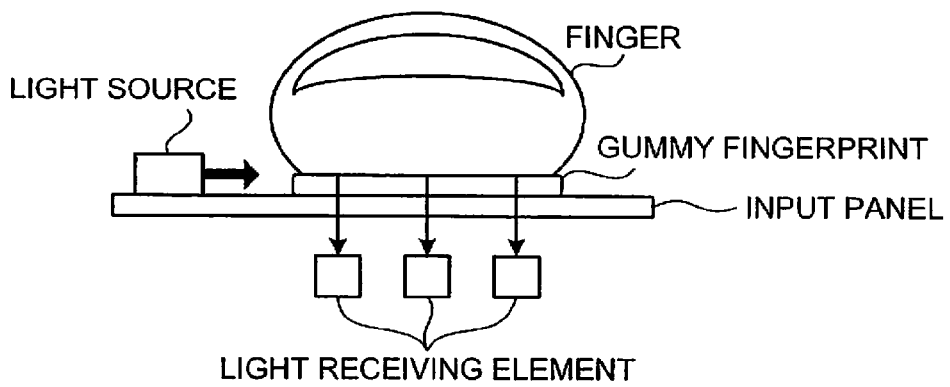
FIG. 1C is an example of detecting a diffused light from the gummy fingerprint.

FIGS. 1B and 1C are examples for explaining the case of fraudulently becoming successful in fingerprint authentication by attaching thin gummy fingerprint made of gummy material with a thickness ranged from 0.5 mm to 2 mm to a surface of a real finger. As shown in FIG. 1C, when placing a finger attached with the gummy fingerprint on an input panel, there appears a thin layer of the gummy fingerprint between the input panel and the finger. As gummy material is highly transmissive, when light is applied from a lateral side of the finger, the light penetrates even the thin layer of the gummy fingerprint as shown in FIG. 1B and diffused light can be detected even from a light receiving element arranged farthest from the light source.

Figure 1D:
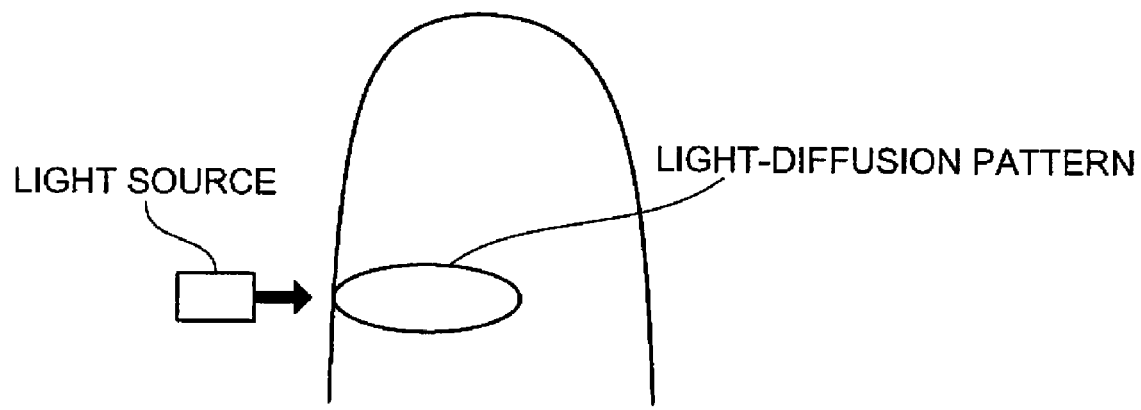
FIG. 1D is an example of a diffusion pattern of a live-finger.
Figure 1E:
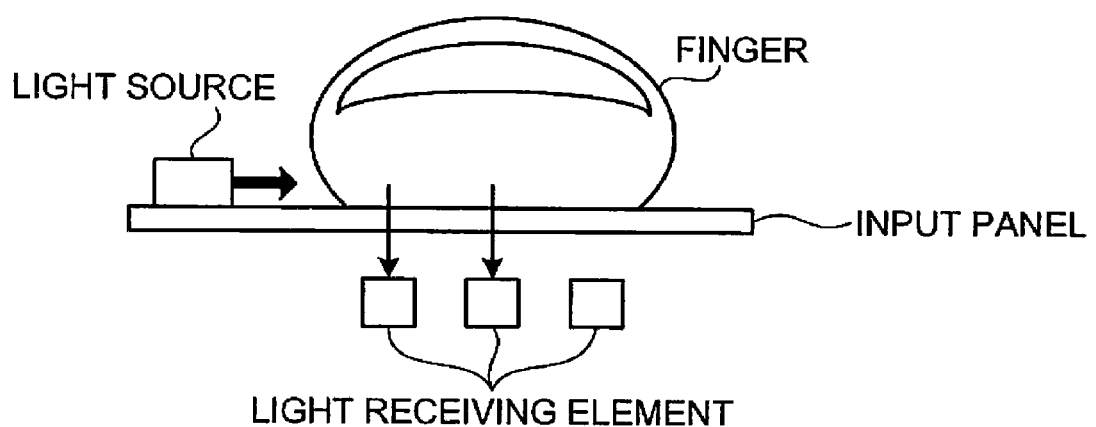
FIG. 1E is an example of detecting a diffused light from the live-finger.

FIGS. 1D and 1E are examples for explaining the case of accurately becoming successful in fingerprint authentication by using a live-finger. The live-finger is transmissive to some extent but not as highly transmissive as gummy material is. Therefore, as shown in FIG. 1D, light applied from a lateral side of the live-finger cannot reach an another side of the live-finger and diffused light can be detected only from a first receiving element arranged closest to the light source and a second light receiving element arranged second closest to the light source as shown in FIG. 1E.

Figure 1F:
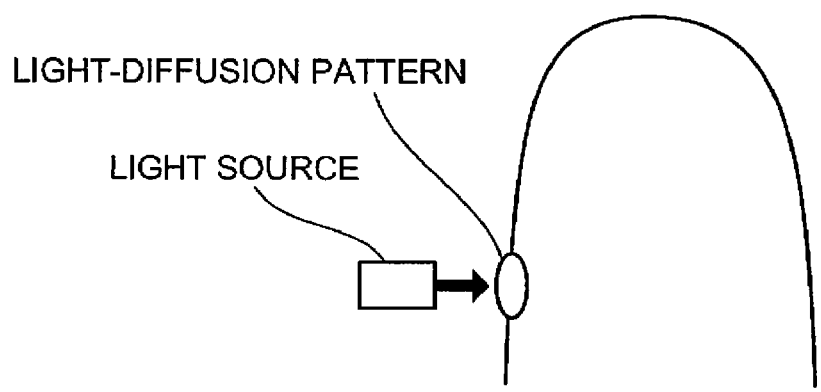
FIG. 1F is an example of a diffusion pattern of a rubber finger.
Figure 1G:
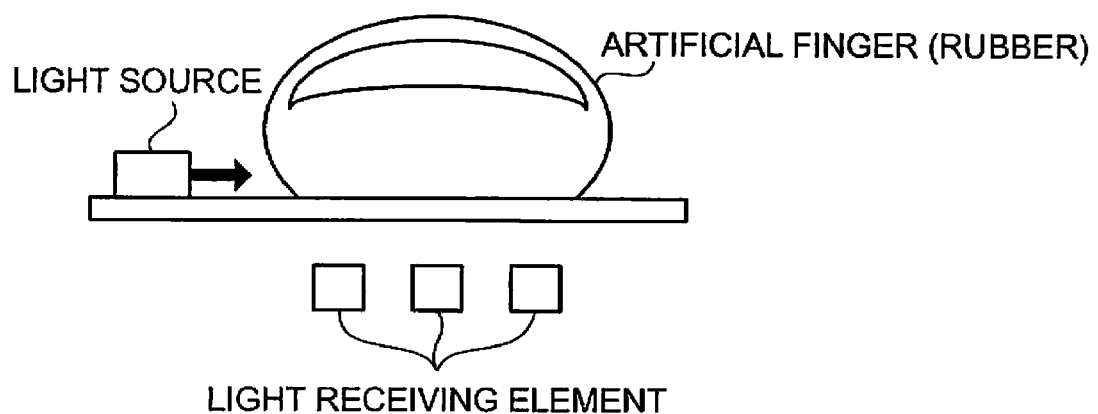
FIG. 1G is an example of detecting a diffused light from the rubber finger.

FIGS. 1F and 1G are examples for explaining the case of fraudulently becoming successful in fingerprint authentication by using an artificial finger made of electrically conductive rubber. The electrically conductive rubber is made by adding such as carbon material to rubber for making the rubber electrically conductive and if an artificial finger is made of the electrically conductive rubber, it makes detection of counterfeit very difficult even by using a capacitance fingerprint sensor or a weak-electric-field fingerprint sensor.

As shown in FIG. 1F, light applied from a lateral side of the rubber finger generates a diffusion pattern in only an extremely small area and not detected even from a light receiving element arranged closest to the light source as shown in FIG. 1G. It is because the electrically conductive rubber is low transmissive resulted from adding such as carbon material for making the rubber electrically conductive.

As described above, the object can be determined whether it is a live-finger or an artificial finger by applying light from a lateral side of the object and measuring a diffusion pattern of the applied light. More specifically, when a size of the diffusion-pattern area is more than a predetermined size or equal to or less than the predetermined size, it is determined that the object is an artificial finger.

When applying light from a lateral side of the object, it is preferable that the light source is arranged so that the light can be applied from a position as closer as possible to an input panel on which the object is placed. It is because, when there is a layer of such as gummy fingerprint between the object and the input panel, light can be applied parallel to the layer, thereby surely detecting variation of light-diffusion patterns generated from the layer.

Figure 2:
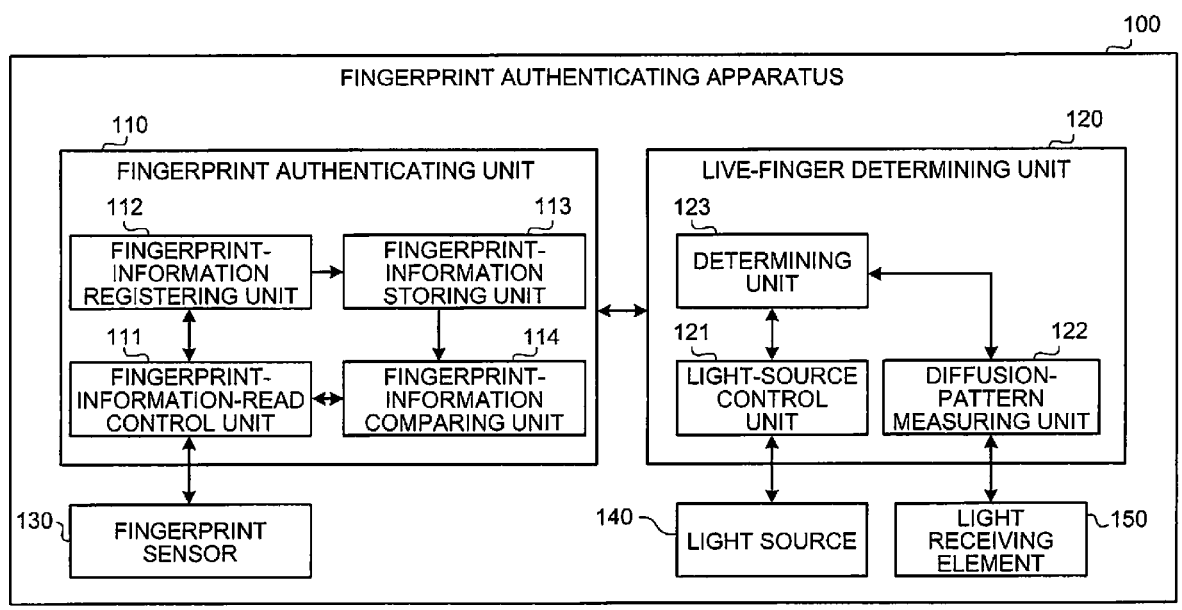
FIG. 2 is a functional block diagram for explaining a structure of a fingerprint authenticating apparatus according to a first embodiment of the present invention.

FIG. 2 is a functional block diagram of a fingerprint authenticating apparatus 100 according to the embodiment. The fingerprint authenticating apparatus 100 includes a fingerprint authenticating unit 110, a live-finger determining unit 120, a fingerprint sensor 130, a light source 140, and a light receiving element 150.

The fingerprint sensor 130 is a sensor for acquiring fingerprint information from an object. The light source 140 is a light source for applying light to the object and the light receiving element 150 is a sensor for measuring a diffusion pattern of light that penetrates the object. Although only a single light receiving element 150 is shown in FIG. 2, it is assumed here that the light receiving element 150 includes a plurality of light receiving elements for measuring the light-diffusion pattern.

The fingerprint authenticating unit 110 performs fingerprint authentication based on the fingerprint information acquired by the fingerprint sensor 130 and includes a fingerprint-authentication-read control unit 111, a fingerprint-information registering unit 112, a fingerprint-information storing unit 113, and a fingerprint-information comparing unit 114.

The fingerprint-authentication-read control unit 111 controls the fingerprint sensor 130 to acquire the fingerprint information. The fingerprint-information registering unit 112 performs an operation to assist the fingerprint-information storing unit 113 to store the authentic fingerprint information of authentic persons acquired by the fingerprint-authentication-read control unit 111. The fingerprint-information storing unit 113 stores the authentic fingerprint information.

The fingerprint-information comparing unit 114 compares the fingerprint information acquired by the fingerprint-authentication-read control unit 111 with the fingerprint information stored in the fingerprint-information storing unit 113 and determines whether the two fingerprint information match.

The live-finger determining unit 120 determines whether the object, from which the fingerprint sensor 130 acquires the fingerprint information, is a live-finger and includes a light-source control unit 121r a diffusion-pattern measuring unit 122, and a determining unit 123.

The light-source control unit 121 controls the light source 140 to apply light to the object. The diffusion-pattern measuring unit 122 measures a diffusion pattern of the light applied from the light source 140 to the object based on a result of detecting diffused light generated from the light receiving element 150. The determining unit 123 controls the light-source control unit 121 to apply the light and the diffusion-pattern measuring unit 122 to measure the diffusion pattern and determines whether the object is a live-finger based on the measured light-diffusion pattern.

When required for performing fingerprint authentication, if the fingerprint authenticating unit 110 determines that the fingerprint information of the object matches with that of the authentic person and the live-finger determining unit 120 determines that the object is a live-finger, the fingerprint authenticating apparatus 100 determines that the authentication is successful.

Next, physical arrangements of the light source 140 and the light receiving element 150 are explained below. The arrangements differ depending on a type of the fingerprint sensor 130 to be combined therein.

Figure 3A:
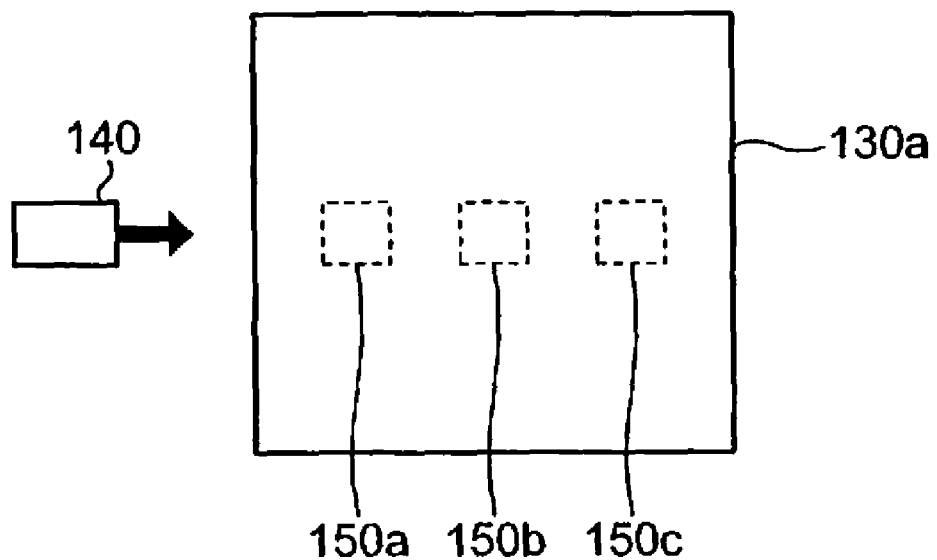
FIGS. 3A and 3B are schematics for explaining the arrangement of the light source and the light receiving elements in combination with an optical planar fingerprint sensor.
Figure 10:
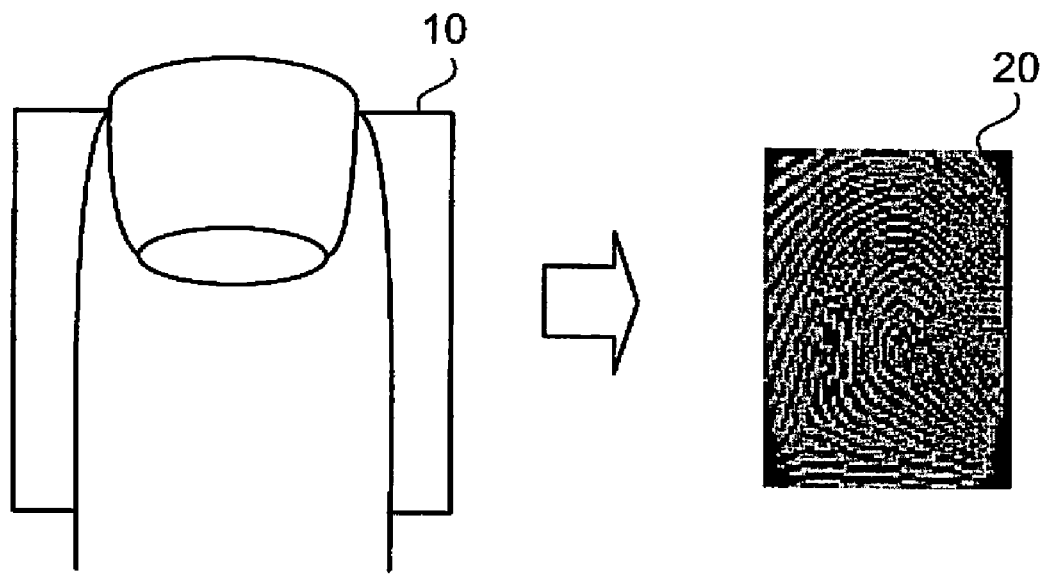
FIG. 10 is a schematic of a planar fingerprint sensor.

FIG. 3A is a schematic for explaining the arrangement of the light source 140 and the light receiving element 150 in combination with an optical planar fingerprint sensor. The planar fingerprint sensor is capable of acquiring fingerprint information 20 with a single scan as shown as a fingerprint sensor 10 in FIG. 10.

Figure 3B:
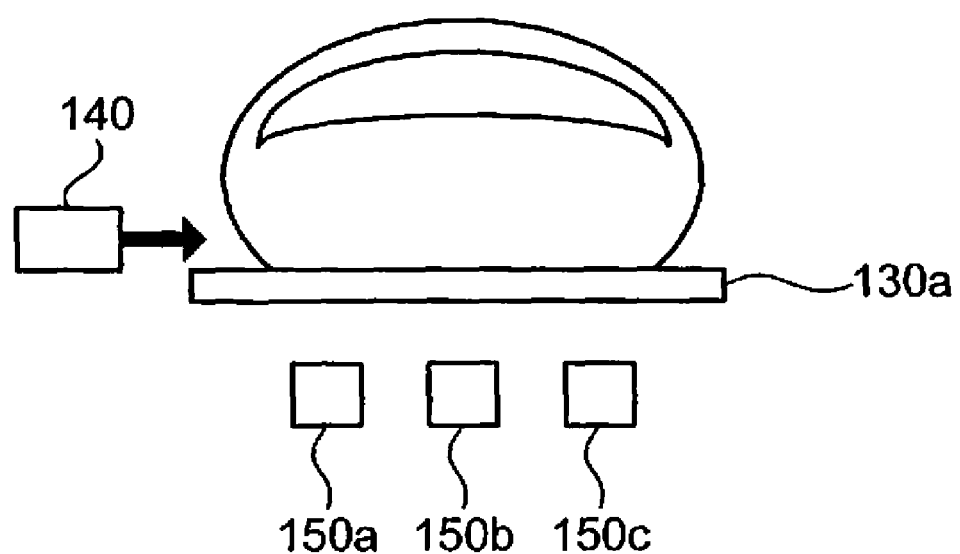

In the case of the optical planar fingerprint sensor, an input panel 130a to be in contact with the object is transparent. Therefore, light receiving elements 150a to 150c can be arranged on the back of the input panel 130a, namely inside the fingerprint sensor 130. Then, the light source 140 is arranged to be in the same line with the light receiving elements 150a to 150c. FIG. 3B illustrates the same arrangement of FIG. 3A from another direction.

In the above arrangement, acquiring the fingerprint information and measuring the light-diffusion pattern can be performed consistently and almost simultaneously, so that it becomes possible to surely prevent a fraud of acquiring the fingerprint information of the artificial finger by the fingerprint sensor 130 and measuring the light-diffusion pattern of the live-finger.

Figure 4:
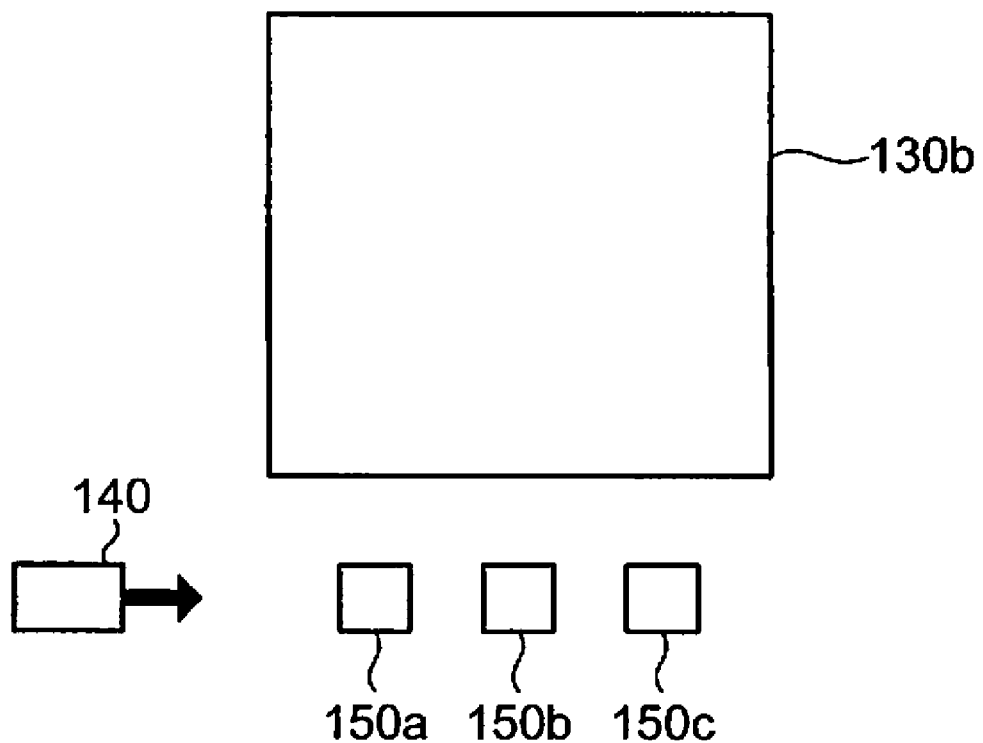
FIG. 4 is a schematic for explaining the arrangement of the light source and the light receiving elements in combination with a weak-electric-field planar fingerprint sensor.

FIG. 4 is a schematic for explaining the arrangement of the light source 140 and the light receiving element 150 in combination with a weak-electric-field planar fingerprint sensor. As the planar finger print sensor is a weak-electric-field type, an input panel 130b to be in contact with the object is not transparent. Therefore, the light receiving elements 150a to 150c are arranged almost on the same plane with the input panel 130b but not to be overlapped each other and the light source 140 is arranged to be in the same line with the light receiving elements 150a to 150c.

In order to prevent the above explained fraud that combines an artificial finger with a live-finger, acquiring the fingerprint information by the fingerprint authenticating unit 110 and measuring the light-diffusion pattern by the live-finger determining unit 120 are required to perform almost simultaneously. Therefore, it is preferable to arrange the light receiving elements 150a to 150c in positions with which an object is expected to be in contact when the object is in contact with the input panel 130b; namely, positions adequately close to the input panel 130b. More particularly, assuming that the object is a finger, it is preferable to arrange the light receiving elements 150a to 150c in positions close to a base of finger.

Figure 5:
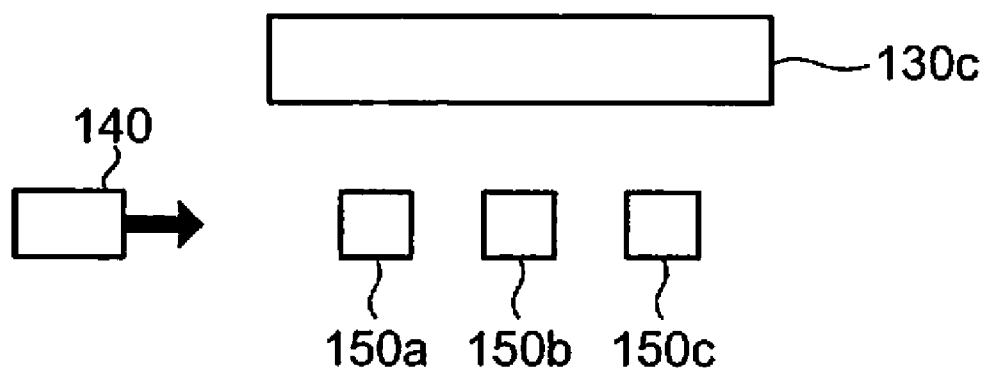
FIG. 5 is a schematic for explaining the arrangement of the light source and the light receiving elements in combination with a reed-shaped fingerprint sensor.
Figure 11:
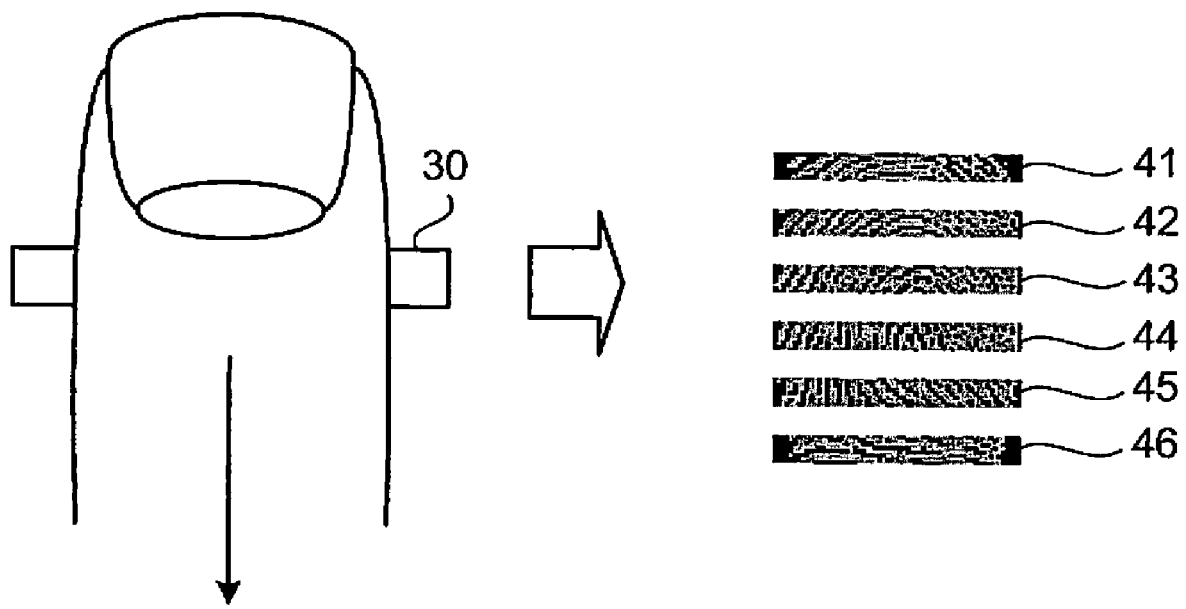
FIG. 11 is a schematic of a reed-shaped fingerprint sensor.

FIG. 5 is a schematic for explaining the arrangement of the light source 140 and the light receiving element 150 in combination with a reed-shaped fingerprint sensor. As shown as a fingerprint sensor 30 in FIG. 11, the reed-shaped fingerprint sensor performs a reading-operation more than once to the object that moves as if scanning thereon and acquires a piece of fingerprint information as a fragment image shown as fingerprint information 41 to 46.

In the reed-shaped fingerprint sensor, a surface to be in contact with the object is generally not transparent. Therefore, the light receiving elements 150a to 150c are arranged almost on the same plane with an input panel 130c but not to be overlapped each other and the light source 140 is arranged to be in the same line with the light receiving elements 150a to 150c.

With the same reason explained in the above configuration combined with the weak-electric-field planar fingerprint sensor, it is preferable to arrange the light receiving elements 150a to 150c in positions adequately close to an upstream side or a downstream side of the input panel 130c in a scanning direction of the object.

Figure 6:
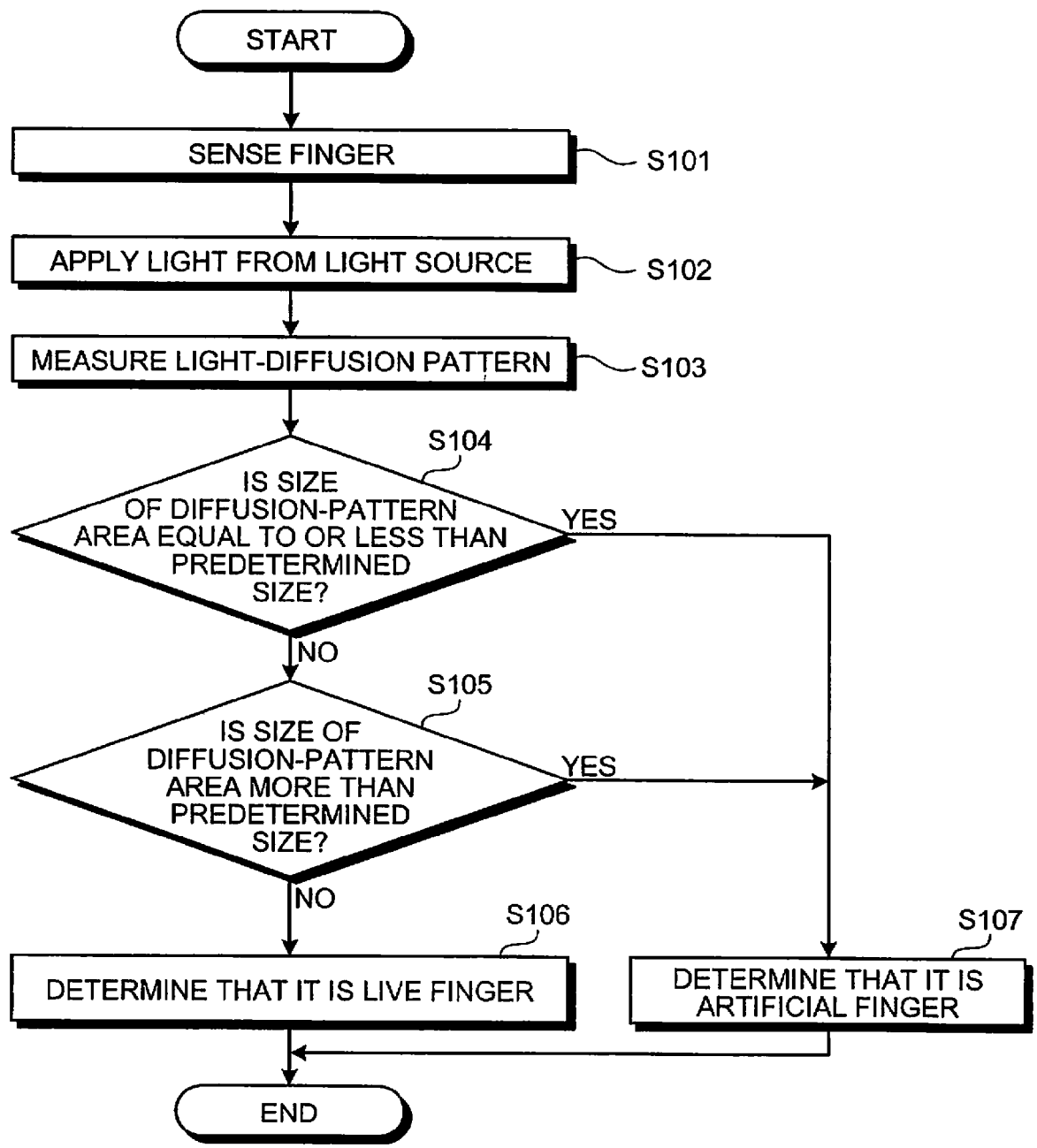
FIG. 6 is a flowchart for explaining an operation performed by a live-finger determining unit shown in FIG. 2.

FIG. 6 is a flowchart for explaining the operation performed by the live-finger determining unit 120. When the determining unit 123 senses an object placed on the fingerprint sensor 130 (step S101), the determining unit 123 instructs the light-source control unit 121 to apply light from the light source (step S102).

Then, the determining unit 123 instructs the diffusion-pattern measuring unit 122 to measure a light-diffusion pattern (step S103), and determines whether the object is a live-finger based on the measured result. More specifically, it is measured how wide the diffusion pattern is spread by referring a distance between the light source 140 and the farthest light receiving sensor from which the diffused light is detected. When a size of the diffusion-pattern area is equal to or less than a predetermined size (YES at step S104), or more than the predetermined size (YES at step S105), the object is determined as an artificial finger (step S107); otherwise (NO at step S104 and NO at step S105), the object is determined as a live-finger (step S106).

As described above, according to the first embodiment, it is configured to apply light from a lateral side of the object and measure a diffusion pattern by using a plurality of light receiving elements arranged therein, so that even when thin artificial fingerprint made of such as gummy material is attached to a surface of a real finger, counterfeit can be appropriately detected by using a difference of light transmission characteristics.

Although, a plurality of light receiving elements are arranged and the light-diffusion pattern is measured by referring from which light receiving element is the light detected, according to the first embodiment, it can be configured to arrange only one light receiving element, change intensity of light applied from the light source at several levels, and determine whether the object is a live-finger by referring at which level of the intensity is the light detected (or not detected).

According to the first embodiment, an example is explained, which measures the light-diffusion pattern of the light applied from the lateral side of the object by using the light receiving elements for determining whether the object is a live-finger. However, in an optical fingerprint sensor, because an image sensor used for acquiring a fingerprint image is pre-installed, it is possible to measure the diffusion pattern of the light without adding the light receiving elements therein.

According to a second embodiment of the present invention, an example is explained with a configuration using the optical fingerprint sensor, which determines whether an object is a live-finger without adding the light receiving elements therein.

Figure 7:
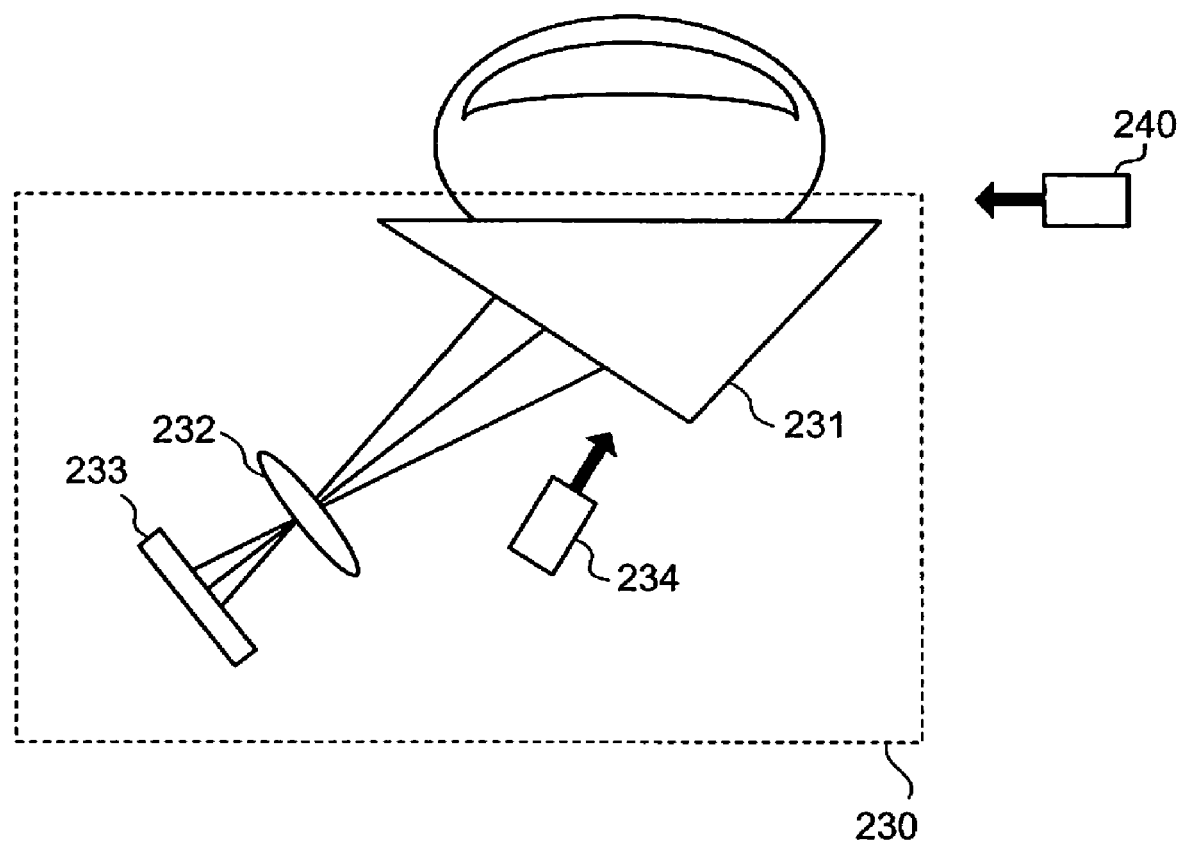
FIG. 7 is a schematic for explaining the concept of a live-finger determining method according to a second embodiment of the present invention.

FIG. 7 is a schematic for explaining the concept of a live-finger determining method according to the second embodiment. An optical fingerprint sensor 230 includes a prism 231 used for refracting a fingerprint image toward a direction of an image sensor 233, a lens 232 used for forming an entire image of the image refracted by the optical fingerprint sensor 230 onto the image sensor 233, the image sensor 233, and a light source 234 used for applying light to an object for acquiring image data in good condition.

The optical fingerprint sensor 230 acquires a first image data of the object to which the light is applied from under the object by the light source 234 and further acquires a second image data of the object to which the light is applied from a lateral side by the light source 234. The first image data is used for determining whether fingerprint information of the object matches with the authentication target and the second image data is used for determining whether the object is a live-finger or an artificial finger based on light-diffusion patterns.

Figure 8:
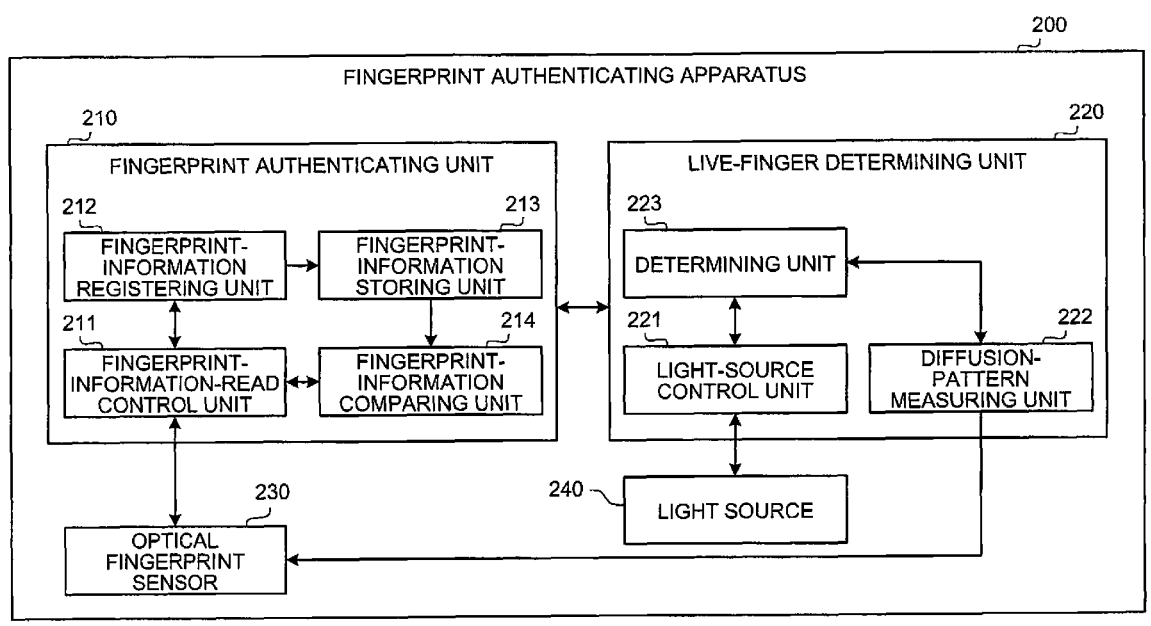
FIG. 8 is a functional block diagram for explaining a structure of a fingerprint authenticating apparatus according to the second embodiment.

FIG. 8 is a functional block diagram for explaining a structure of a fingerprint authenticating apparatus 200 according to the second embodiment. The fingerprint authenticating apparatus 200 includes a fingerprint authenticating unit 210, a live-finger determining unit 220, the optical fingerprint sensor 230, and a light source 240.

The optical fingerprint sensor 230 is used for acquiring an image data of an object. The light source 240 is a light source for applying light from a lateral side of the object.

The fingerprint authenticating unit 210 performs fingerprint authentication by using the image data acquired by the optical fingerprint sensor 230 for the fingerprint authentication and includes a fingerprint-information-read control unit 211, a fingerprint-information registering unit 212, a fingerprint information storing unit 213, and a fingerprint-information comparing unit 214.

The fingerprint-information-read control unit 211 controls the optical fingerprint sensor 230 to acquire image data used for fingerprint authentication. The fingerprint-information registering unit 212 performs an operation to assist the fingerprint information storing unit 213 to store the image data (or featured information) acquired by the fingerprint-information-read control unit 211 for the fingerprint authentication as an authentication target. The fingerprint information storing unit 213 stores the image data (or featured information) of fingerprint of the authentication target.

The fingerprint-information comparing unit 214 compares the image data (or featured information) acquired by the fingerprint-information-read control unit 211 for the fingerprint authentication with the image data (or featured information) stored in the fingerprint information storing unit 213 and determines whether the two image data match.

The live-finger determining unit 220 determines whether the object from which the image data is acquired by the optical fingerprint sensor 230 is a live-finger and includes a light-source control unit 221, a diffusion-pattern determining unit 222, and a determining unit 223.

The light-source control unit 221 controls the light source 240 to apply light from a lateral side of the object. The diffusion-pattern determining unit 222 performs an operation to assist the optical fingerprint sensor 230 to acquire image data used for determining a live-finger and measures a diffusion pattern of the light applied from the light source 240 by using the acquired image data. The determining unit 223 controls the light-source control unit 221 to irradiate the light and the diffusion-pattern determining unit 222 to measure the diffusion pattern and determines whether the object is a live-finger based on the measured light-diffusion pattern.

When required for performing fingerprint authentication, if the fingerprint authenticating unit 210 determines that the fingerprint information of the object matches with the authentication target and the live-finger determining unit 220 determines that the object is a live-finger, the fingerprint authenticating apparatus 200 determines that the authentication is successful. In order to perform operations of acquiring the image data used for fingerprint authentication and acquiring the image data used for determining a live-finger to the same object with certainty, it is preferable to complete the operations of acquiring the two image data successively and in shorter time.

Figure 9:
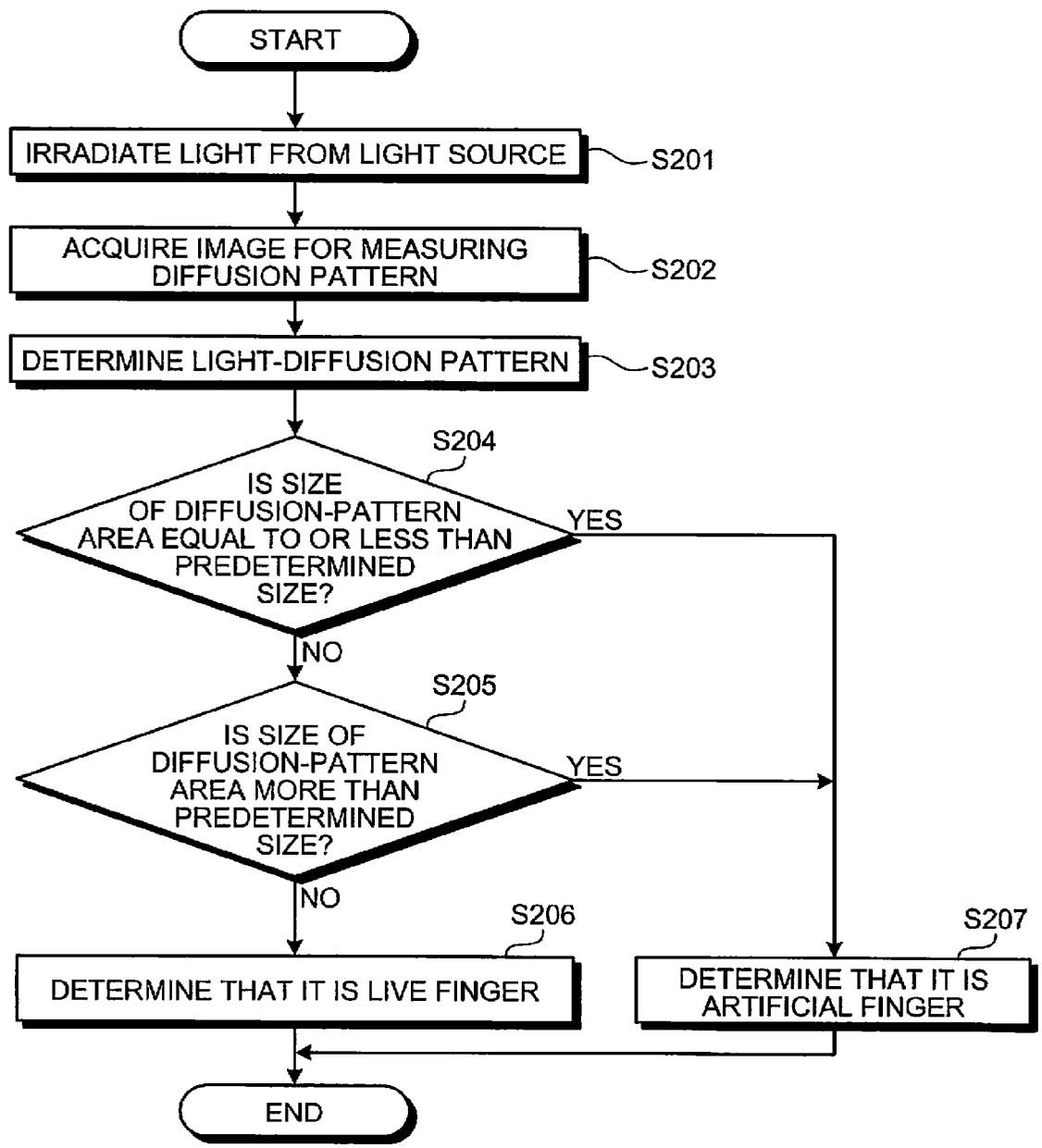
FIG. 9 is a flowchart for explaining an operation performed by a live-finger determining unit shown in FIG. 8.

FIG. 9 is a flowchart for explaining the operation performed by the live-finger determining unit 220. The determining unit 223 instructs the light-source control unit 221 to apply light from the light source 240 (step S201), instructs the diffusion-pattern determining unit 222 to acquire image data of the object (step S202), and measures a light-diffusion pattern based on the acquired image data (step S203).

Then, the determining unit 223 determines whether the object is a live-finger based on the measured result. More specifically, when a size of the diffused light area in the image data is equal to or less than a predetermined size (YES at step S204), or more than the predetermined size (YES at step S205), the object is determined as an artificial finger (step S207); otherwise (NO at step S204 and NO at step S205), the object is determined as a live-finger (step S206).

As described above, according to the second embodiment, it is configured to apply light from a lateral side of the object and measure a diffusion pattern by using the image data of the object, so that even when thin artificial fingerprint made of such as gummy material is attached to a surface of a real finger, counterfeit can be appropriately detected by using a difference of light transmission characteristics.

Although the above embodiments are explained in the case of applying the live-finger determining method according to the present invention to the fingerprint authenticating apparatus, devices or other objects for applying the live-finger determining method according to the present invention is not limited to the fingerprint authenticating apparatus. For example, it is possible to use the live-finger determining method to configure a device dedicated for determining a live-finger or devices other than the fingerprint authenticating apparatus.

According to an embodiment of the present invention, it is configured to apply light from a lateral side of an object and measure a light-diffusion pattern, so that counterfeit can be appropriately detected by using a difference of light transmission characteristics even when thin artificial fingerprint made of such as gummy material is attached to a surface of a real finger.

Moreover, according to an embodiment of the present invention, it is configured to apply light from a lateral side of an object and measure a light-diffusion pattern by using a plurality of light receiving elements arranged therein, so that counterfeit can be appropriately detected by using a difference of light transmission characteristics even when thin artificial fingerprint made of such as gummy material with a thickness ranged from 0.5 millimeters (mm) to 2 mm is attached to a surface of a real finger.

Furthermore, according to an embodiment of the present invention, it is configured to apply light from a lateral side of an object and measure a light-diffusion pattern by using image data of the object, so that counterfeit can be appropriately detected by using a difference of light transmission characteristics even when thin artificial fingerprint made of such as gummy material is attached to a surface of a real finger.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A fingerprint authenticating apparatus that authenticates a user by comparing fingerprint information acquired from the user with pre-registered fingerprint information, the fingerprint authenticating apparatus comprising:
 a fingerprint sensor that is a capacitance fingerprint sensor or a weak-electric-field fingerprint sensor and acquires fingerprint information of an object being in contact with a surface of the fingerprint sensor;
 a light source that is arranged adjacent to the surface of the fingerprint sensor and irradiates a light to the object from a lateral side of the fingerprint sensor;
 a plurality of light receiving elements that detects the light, each of which being arranged in a same direction as a direction of the light irradiated by the light source and arranged with a different distance from the light source;
 a measuring unit that measures a diffusion pattern of the light passing through the object based on which light receiving element, from among the light receiving elements, detected the light; and
 a determining unit that determines whether the object is a live finger or an artificial finger based on the diffusion pattern measured by the measuring unit.

2. The fingerprint authenticating apparatus according to claim 1, wherein
 the light receiving elements are arranged in positions on which the object is expected to be in contact with the fingerprint sensor.

3. A live-finger determining apparatus comprising:
 an input panel on which an object is to contact, the input panel being a panel of a capacitance fingerprint sensor or a weak-electric-field fingerprint sensor;
 a light source that is arranged adjacent to the input panel and irradiates a light to the object being in contact with the input panel from a lateral side of the input panel;
 a plurality of light receiving elements that detects the light, each of which being arranged in a same direction as a direction of the light irradiated by the light source and arranged with a different distance from the light source;
 a measuring unit that measures a diffusion pattern of the light passing through the object based on which light receiving element, from among the light receiving elements, detected the light; and
 a determining unit that determines whether the object is a live finger or an artificial finger based on the diffusion pattern measured by the measuring unit.

4. The live-finger determining apparatus according to claim 3, further comprising:
 a light receiving element that detects the light, being arranged with a predetermined distance from the light source, wherein
 the measuring unit measures the diffusion pattern based on a combination of a result of detecting the light by the light receiving element and an intensity of the light from the light source.

5. A live-finger determining method comprising:
 irradiating a light to an object from a lateral side of the object, the object being in contact with a surface of a capacitance fingerprint sensor or a weak-electric-field fingerprint sensor, and the light being irradiated by a light source that is arranged adjacent to the surface of the capacitance finger print sensor or the weak-electric-field fingerprint sensor;
 detecting the light using a plurality of light receiving elements, each of which being arranged in a same direction as a direction of the light irradiated by the light source and arranged with a different distance from the light source;
 measuring a diffusion pattern of the light passing through the object based on which light receiving element, from among the light receiving elements, detected the light; and
 determining, using a processor, whether the object is a live finger or an artificial finger based on the diffusion pattern measured at the measuring.

* * * * *